US012730235B2

(12) United States Patent
Sum et al.

(10) Patent No.: US 12,730,235 B2
(45) Date of Patent: Sep. 8, 2026

(54) RADIOMETRIC MEASURING DEVICE COMPRISING A HOLDING ELEMENT AND A SCINTILLATOR ARRANGED IN THE HOLDING ELEMENT

(71) Applicant: VEGA Grieshaber KG, Wolfach (DE)

(72) Inventors: Christian Sum, Wolfach (DE); Florian Osswald, Gutach (DE); Matthias Schmid, Schenkenzell (DE)

(73) Assignee: VEGA Grieshaber KG, Wolfach (DE)

( * ) Notice: Subject to any disclaimer, the term of this patent is extended or adjusted under 35 U.S.C. 154(b) by 57 days.

(21) Appl. No.: 18/429,966

(22) Filed: Feb. 1, 2024

(65) Prior Publication Data

US 2024/0272314 A1 Aug. 15, 2024

(30) Foreign Application Priority Data

Feb. 9, 2023 (DE) ........................ 102023103114.7

(51) Int. Cl.
*G01T 1/20* (2006.01)

(52) U.S. Cl.
CPC ........ *G01T 1/20188* (2020.05); *G01T 1/2006* (2013.01); *G01T 1/2018* (2013.01)

(58) Field of Classification Search
CPC ....... G01T 1/20; G01T 1/2006; G01T 1/2018; G01T 1/20185; G01T 1/20186; G01T 1/20187; G01T 1/20188; G01T 1/202
USPC ........................ 250/361 R, 370.11; 378/98.8
See application file for complete search history.

(56) References Cited

U.S. PATENT DOCUMENTS

| | | | | |
|---|---|---|---|---|
| 4,383,175 | A * | 5/1983 | Toepke | G01T 1/20 250/361 R |
| 4,629,888 | A | 12/1986 | Wolk | |
| 4,764,677 | A * | 8/1988 | Spurney | G01T 1/202 250/361 R |
| 4,900,937 | A * | 2/1990 | Dayton | G01T 1/202 250/361 R |
| 5,283,439 | A * | 2/1994 | Bouissou | G01T 1/2002 250/361 R |
| 5,753,919 | A | 5/1998 | Prain et al. | |

(Continued)

FOREIGN PATENT DOCUMENTS

| | | | |
|---|---|---|---|
| DE | 102006048266 | A1 | 4/2008 |
| DE | 102020206944 | A1 | 12/2021 |

(Continued)

OTHER PUBLICATIONS

German Application No. DE 10 2023 103 114.7, Office Action dated Dec. 19, 2023.

(Continued)

*Primary Examiner* — Allen C. Ho
(74) *Attorney, Agent, or Firm* — Wood Herron & Evans LLP

(57) ABSTRACT

The invention relates to a radiometric measuring device having a housing and a scintillator which is arranged in the housing, wherein one end of the scintillator is arranged in a holding element, wherein the holding element has a holding region for the end of the scintillator, wherein the holding element is formed in such a manner that the holding element centers the scintillator in the transverse direction (r) inside the housing. The invention further relates to a scintillator holding element.

11 Claims, 2 Drawing Sheets

(56) References Cited

U.S. PATENT DOCUMENTS 5,869,836 A * 2/1999 Linden .................. G01T 1/2002 250/361 R
6,657,199 B2 * 12/2003 Frederick .................. G01T 1/20 250/361 R
7,132,662 B2 * 11/2006 Baldwin ................. G01T 1/167 250/361 R
7,170,061 B2 * 1/2007 Clarke .................... G01T 1/202 250/361 R
7,629,584 B2 * 12/2009 Mormann ................. G01T 1/20 250/361 R
7,675,040 B2 * 3/2010 Menge ...................... G01T 1/20 250/370.15
7,820,974 B2 * 10/2010 Menge .................. G01T 1/2023 250/361 R
7,829,857 B2 * 11/2010 Menge .................... G01T 1/202 250/369
7,884,316 B1 * 2/2011 Menge ...................... G01T 1/20 250/261
8,039,806 B2 * 10/2011 Frank ........................ G01T 1/20 378/207
8,143,582 B2 * 3/2012 Fruehauf ................... G01T 1/20 250/361 R
8,217,356 B2 * 7/2012 Fruehauf ................. G01T 1/202 250/361 R
8,604,416 B2 * 12/2013 Fruehauf ................... G01T 1/00 250/261
8,785,841 B1 * 7/2014 Stephenson ......... G01T 1/20188 250/269.1
8,803,075 B2 * 8/2014 Menge ...................... G01T 1/28 250/261
8,803,097 B2 * 8/2014 Hunt ..................... G01T 1/2002 250/269.1
8,907,289 B2 * 12/2014 Wraight .................. G01T 1/202 250/361 R
9,000,359 B2 * 4/2015 Stoller ...................... G01T 1/20 250/256
9,000,379 B2 * 4/2015 Simonetti ............... G01T 1/202 250/361 R
9,057,790 B2 * 6/2015 Perna ...................... G01T 1/208
9,316,747 B2 * 4/2016 Becherer ................... G01T 1/20
9,395,464 B2 * 7/2016 Stephenson ........... G01T 1/2002
9,446,379 B2 * 9/2016 Yang ....................... G01T 1/202
9,715,022 B2 * 7/2017 Ziegler ..................... G01T 1/20
9,880,295 B2 * 1/2018 Stephenson ........... G01T 1/2006
10,132,938 B2 * 11/2018 Climent .................. G01T 1/202
10,649,099 B2 * 5/2020 Deere ..................... G01T 1/202
10,775,516 B2 * 9/2020 Frank .................... G01T 1/2006
11,255,982 B2 * 2/2022 McLaughlin, II .. G01T 1/20189
2005/0224717 A1 10/2005 Clarke et al.
2010/0072398 A1 3/2010 Fruehauf
2010/0193690 A1 8/2010 Hunt

FOREIGN PATENT DOCUMENTS

DE 102022105762 A1 9/2023
EP 0831337 A1 3/1998
WO 2002101415 A1 12/2002
WO 2010135489 A2 11/2010
WO 2013049775 A2 4/2013
WO 2015020713 A2 2/2015
WO 2019221777 A2 11/2019

OTHER PUBLICATIONS

GB Application No. GB2401652.9 Search Report dated Jul. 10, 2024.

* cited by examiner

RADIOMETRIC MEASURING DEVICE COMPRISING A HOLDING ELEMENT AND A SCINTILLATOR ARRANGED IN THE HOLDING ELEMENT

CROSS REFERENCE TO RELATED APPLICATION

This application claims benefit of German national application number DE102023103114.7, filed Feb. 9, 2023, the entirety of which is incorporated herein by reference.

FIELD OF THE INVENTION

The invention relates to a radiometric measuring device.

BACKGROUND OF THE INVENTION

In radiometric fill level measurement, the fill level state of tank containers is for example determined with the aid of gamma radiation from a caesium or cobalt source. The measurement is based on the premise that the gamma rays which are emitted are attenuated when they penetrate matter and the radioactive radiation which still penetrates the material is detected by means of a radiometric measuring device.

Such radiometric measuring devices generally contain a scintillator which for example consists of a crystal, a light detector, and evaluation electronics. Emitted gamma radiation which impinges on the scintillator generates flashes of light in the scintillator. These reach the light detector (partly via optical elements), where they are converted into electric pulses and amplified. The pulse rate (number of pulses per second) is a measure for the intensity of the radiation. Depending on the calibration, the pulse rate is converted by the evaluation electronics into a fill-level, limit-switch, density or concentration signal.

The scintillator is a sensitive crystal. The scintillator is generally arranged in a housing and must particularly be protected from mechanical damage, from moisture and also ambient light.

The object on which the invention is based is to provide a radiometric measuring device and a scintillator holding element which enable a particularly secure and practical arrangement of a scintillator in a housing.

SUMMARY OF THE INVENTION

The object is achieved according to the invention.

A radiometric measuring device according to the invention comprises a housing and a scintillator which is arranged in the housing. Further, the radiometric measuring device in particular also comprises a light detector, such as a photomultiplier for example. The scintillator generates flashes of light from the detected radioactive radiation, which are forwarded to the light detector. The scintillator can in particular be arranged in a first housing part and the light detector can be arranged in a second housing part. For reasons of explosion protection, the first housing part and the second housing part are closed, particularly in an airtight manner, with respect to one another and separated from one another by an optically transparent element.

The radiometric measuring device is in particular a measuring device for detecting contents and states of a container, properties or states of materials in a container, or properties or states of materials in general. Examples of this are fill level measurement, flow measurement, limit level measurement, pressure measurement, density measurement, concentration measurement, separation layer measurement, object detection or further suitable types of measurements.

The scintillator has a length which extends in the longitudinal or axial direction, respectively. The longitudinal axis of the scintillator coincides in this case (in the case of a cylindrical scintillator) with the z axis of a cylindrical coordinate system. Furthermore, the scintillator has a width which extends in the transverse direction—perpendicular to the longitudinal direction. In the case of a cylindrical scintillator, the transverse direction corresponds to the radial direction. The scintillator in particular has a round or square cross section.

One end of the scintillator is arranged in a holding element, wherein the holding element has a holding region for at least one section of the scintillator. The holding element is to this end formed in a u-shaped manner, particularly as viewed in cross section, and surrounds the scintillator at least over a part of its length in the longitudinal direction. In the holding region, the scintillator is fixed positively in the transverse direction.

The holding element is further set up in such a manner that the holding element centres the scintillator inside the housing in the transverse direction. In particular, the holding element is supported on the inner side of the housing. Thus, a secure, stable and central arrangement of the scintillator in the housing is effected by means of the holding element. The scintillator therefore does not hit the housing wall in the event of vibrations. In particular, when the scintillator is introduced together with the holding element into the housing, the holding element acts as a guide.

The holding element is in particular formed from plastic and can be produced particularly inexpensively by means of injection moulding methods.

For holding in a centring manner, resilient support elements are arranged on the outside of the holding element, by means of which the holding element is supported on the internal wall of the housing. The support elements are arranged in a distributed manner over the circumference of the holding element in particular and thus enable a self-centring holding of the scintillator in the housing. The support elements can deflect inwards as viewed in the transverse direction. By means of the resilient support elements, manufacturing-related tolerances can be compensated in particular and vibrations can also be damped.

The support elements are in particular wings which are arranged at one end on the outside of the holding element and have a free end and extend over a part of the circumference of the holding element. The connecting point of the wing to the rest of the holding element extends in the longitudinal direction in particular. Due to the one-sided connection, the wings can deflect and rebound resiliently. There are in this case a plurality of wings arranged in a distributed manner over the outside of the holding element.

In particular, the wings in each case have thickenings at their free ends. The thickenings are in particular arranged on the outside of the wing, which faces away from the holding element. The thickenings in each case extend over at least a part of the height of a wing. The thickenings are used as a bearing surface on the internal wall of the housing. The thickenings in particular have a flat, planar surface on the outside.

In a practical embodiment of the radiometric measuring device, the holding region is designed to hold both a scintillator with circular cross section and a scintillator with angular, rectangular or square cross section. The holding element is accordingly a universal receptacle, by means of which various scintillators can be arranged in the housing in a stable manner. Thus, scintillators with angular, rectangular or square and round cross section or else fibre bundles with resultant round or angular cross section can be arranged therein.

For this, as viewed in a plan view, the holding region in particular has curved side walls, which lie on an imaginary circular line, and indentations between the side walls, which form the corners of an imaginary square. In the case of a scintillator with circular cross section, the scintillator then bears against the curved side walls and is positively held by the same. The indentations or corners then remain unfilled. When holding a scintillator with angular, rectangular or square cross section, the scintillator extends as far as into the indentations and bears against the side walls of the indentations, the curved side walls are spaced from the scintillator.

In a further practical embodiment, the support elements extend from the indentations. The corners of the indentations are used accordingly as fastening point for the support elements, which extend from there over a part of the circumference of the holding element. In particular, two support elements (wings) extend from each indentation in opposite directions. In total, the holding element therefore has eight support elements or wings.

The holding region has an insertion chamfer for inserting the scintillator. Therefore, the insertion of the scintillator into the holding region during assembly can be simplified and the scintillator is arranged in a centred manner in the holding section.

In a further practical embodiment of the radiometric measuring device, the scintillator is connected via the holding element to a restoring element, wherein the scintillator is pressed by means of the restoring element in the axial direction against a support. The support is in particular a region facing the light detector. Here, this may be an optical pad which in turn bears against a window element. In this case, for reasons of explosion protection, the window element separates the housing with the scintillator from a further housing in which the light detector is arranged. The restoring element is in particular a spring, particularly a coil spring. The restoring element is used to produce a best possible optical contact to the light detector, even in the case of a temperature-related expansion of the scintillator and in the case of vibrations. The restoring element extends in particular from an end face of the housing to the holding element.

In particular, the restoring element is arranged in a captive manner on the side of the holding element which faces away from the scintillator in the axial direction. Preferably, the restoring element is arranged on the side of the base which faces away from the scintillator. That is to say, the restoring element is here fastened to the holding element positively at least in the axial direction. Therefore, the assembly of the radiometric measuring device can be facilitated further. If the holding element and the restoring element are present in an already connected manner and are introduced in the housing, the relative positioning is retained and the exertion of a restoring force on the scintillator is ensured.

For fixing the restoring element, the base body in particular has a plurality of undercuts, behind which the restoring element engages. The undercuts are in particular formed by curved tabs which protrude into a receptacle for the restoring element. The outer circular receptacle for the restoring element, which is in particular formed by a circumferential side wall, preferably has four inwardly curved tabs or wall sections, behind which the restoring element engages. The tabs are in particular distributed uniformly over the circumference of the restoring element receptacle. In particular, an opening is formed between the tabs and the further receptacle for the restoring element.

The restoring element is in particular also fixed radially internally in a positive manner by means of a fixing structure. The fixing structure can be formed on the base body as a circumferential rib. In particular, the fixing structure has a trefoil-shaped or rosette-shaped geometry, having a plurality of bulges. The bulges bear in particular radially internally against the restoring element. In particular, the bulges are opposite the inwardly curved tabs, so that in each case the restoring element is fixed in a clamping manner between tabs and bulges.

The invention further relates to a holding element or a scintillator holding element having a holding region for one end of the scintillator, wherein the holding element is set up in such a manner to centre the scintillator in the transverse direction inside a housing. With respect to the further geometric configurations of the scintillator holding element, reference is made to the preceding description.

BRIEF DESCRIPTION OF THE DRAWINGS

Further practical advantages and embodiments are described in the following in connection with the figures. In the figures.

DETAILED DESCRIPTION OF THE DRAWINGS

Figure 1:
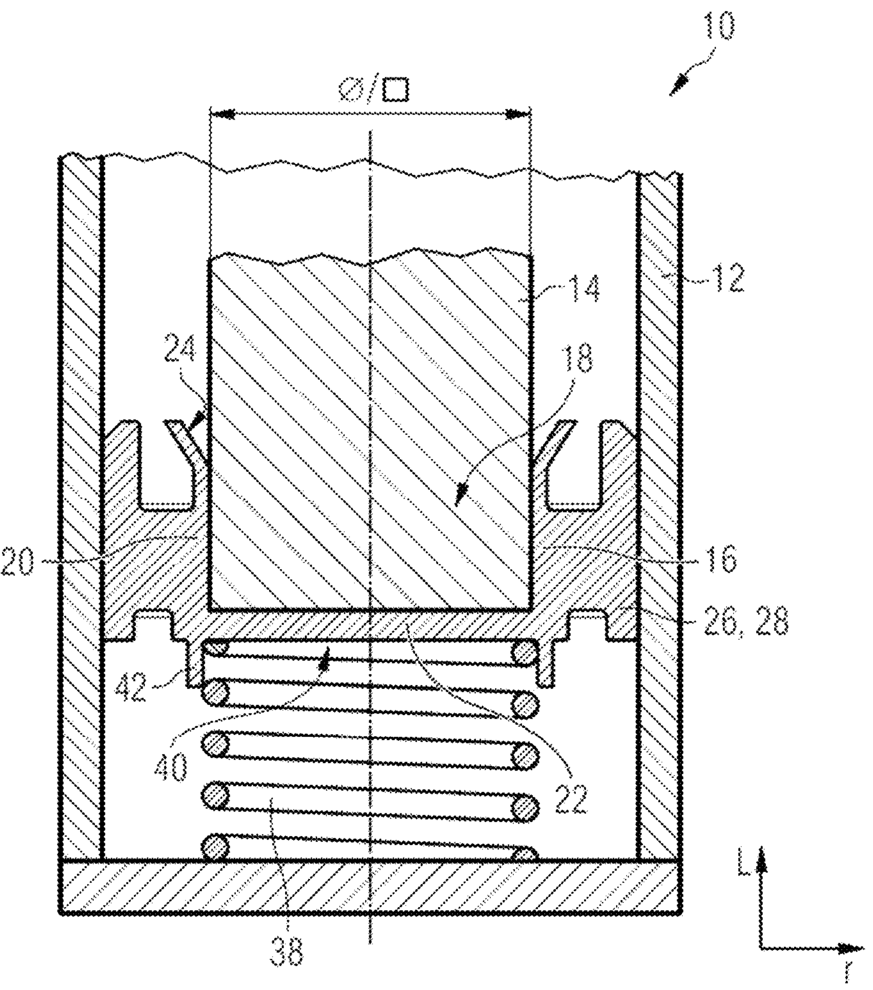
FIG. 1 shows a part of a radiometric measuring device in cross section.

FIG. 1 illustrates a part of a radiometric measuring device 10 having a housing 12 and a scintillator 14 which is arranged in the housing 12. The scintillator 14 has a longitudinal direction L and a transverse direction R.

One end of the scintillator 14—the end of the scintillator 14 which faces away from a light detector (not illustrated here)—is held in a holding element 16. The holding element 16 has a holding region 18 for this. The holding element 16 is formed in a u-shaped manner in the region of the holding region 18, as viewed in cross section, and surrounds the end of the scintillator 14. The holding region 18 correspondingly has side walls 20 and a base 22 surrounding the scintillator 14. The scintillator 14 is fixed in the holding element 16 positively as viewed in the transverse direction. In order to introduce the scintillator 14 into the holding region 18 as well and centrally as possible, the holding region 18 has an insertion chamfer 24 on the side wall 20 which surrounds the scintillator 14.

Figure 2:
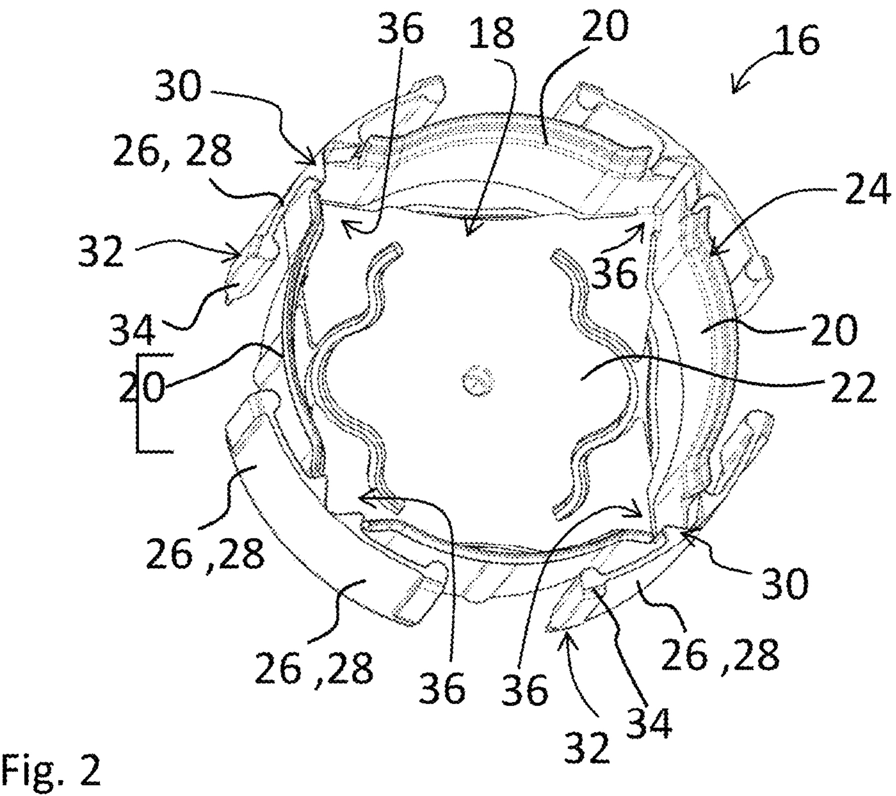
FIG. 2 shows a holding element in a perspective view from above.

Furthermore, the holding element 16 is designed in such a manner that the scintillator 14 is centered in the housing 12 in the transverse direction. To this end, the holding element 16 has resiliently formed support elements 26 which are arranged on the outside. These can be seen particularly well in FIG. 2. The support elements 26 are formed as wings 28 which extend over a large part of the height of the holding element 16, which extends in the longitudinal direction, and over a part of the circumference of the holding element 16. The wings 28 are in each case fastened to the holding element 16 using one end 30. From the first end 30, the wings 28 extend, spaced from the holding element 16, in the circumferential direction up to a free end 32. The wings 28 can, as a result, deflect and rebound in the radial direction relative to the holding element 16. Thickenings 34 are formed in each case at the free ends 32 of the wings 28. The thickenings 34 extend here in each case in the longitudinal direction of the free end 32. The thickenings 34 are in each case formed in a flattened manner on the side of the wing 28 which faces outwards and are used for bearing against the inner side of the housing 12.

The holding element 16 is designed to positively hold scintillators 14 with circular and with square or rectangular cross section. To this end, the holding region 18 has curved side walls 20 which are located on an imaginary circle. Furthermore, the holding region 18 here has four indentations 36 which form the corners of an imaginary square (cf. FIG. 2). In the case of a scintillator 14 with round cross section, the scintillator bears against the curved side walls 20 and is positively fixed by the same in transverse directions. The indentations 36 remain unfilled. In the case of a scintillator 14 with square cross section, the scintillator 14 bears against the indentations 36 (corners) and is positively fixed by the same in the transverse direction. In each case, there a gap remains between the scintillator 14 and the curved side walls 20.

The wings 28 extend starting from the indentations 36 in each case, wherein two wings 28 extend from each indentation 36 in opposite directions along the outer circumference of the holding element 16.

Furthermore, the holding element 16 is also used for arranging a restoring element 38 on the scintillator 14. The restoring element 38 is a coil spring here. The coil spring 38 is supported in this case on the base of the housing 12 and is used to press one end of the scintillator 14 against a support (not illustrated), in order to realize a best possible optical transition between the scintillator 14 and the light element.

The restoring element 38 is arranged in a captive manner here on the base 22 of the holding element 16, specifically on the opposite side of the base 22 from the holding region 18.

Figure 3:
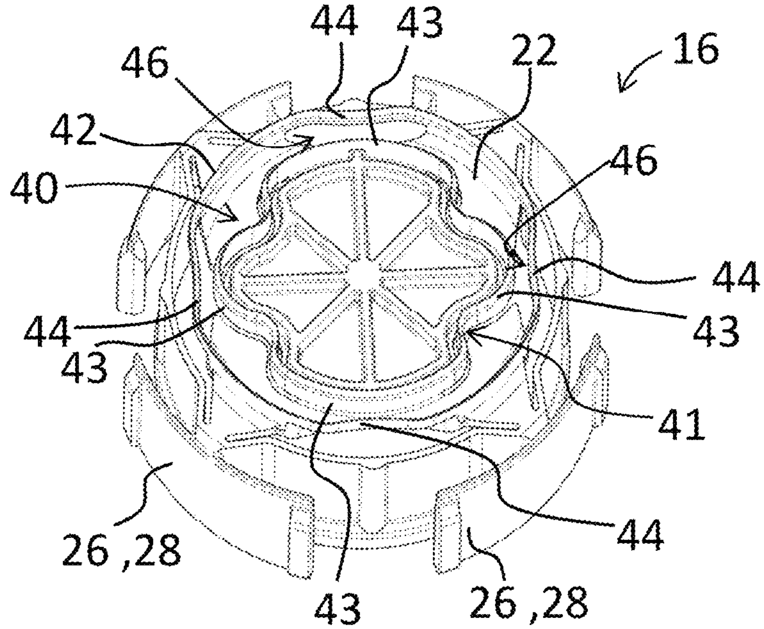
FIG. 3 shows the holding element from FIG. 2 in a perspective view from below.

As can be seen well in FIG. 3, the base 22 has a receptacle 40 for the coil spring 38 to this end. The receptacle 40 comprises a fixing structure 41 which bears radially internally against the coil spring 38 and positively fixes the same inwardly. This fixing structure 41 is here formed by means of a circumferential rib having a trefoil-like geometry which has four bulges 43 here.

Furthermore, the receptacle 40 has a circular circumferential side wall 42 which positively fixes the coil spring 38 radially externally. The side wall 42 has inwardly protruding tabs 44 which form an undercut 46 and behind which a winding of the coil spring 38 engages. The tabs 44 are formed as inwardly curved sections of the side wall 42. By means of the undercuts 46 and tabs 44, the coil spring 38 is also fixed to the holding element 16 positively in the longitudinal direction. The bulges 43 of the trefoil-like fixing structure 41 are in each case opposite the tabs 44, so that in each case the coil spring 38 is fixed in a clamping manner between the tabs 44 and the bulges 43.

The invention claimed is:

1. A radiometric measuring device comprising:

a housing;

a holding element;

a scintillator, which is arranged in the housing, one end of the scintillator being arranged in the holding element, wherein the holding element has a holding region for the one end of the scintillator, and wherein the holding element is formed in such a manner that the holding element centers the scintillator in a transverse direction inside the housing, and resilient support elements arranged on an outside of the holding element, by means of which the holding element is supported on an internal wall of the housing, wherein the resilient support elements include wings, which extend over a part of a circumference of the holding element.

2. The radiometric measuring device according to claim 1, wherein at least one wing of the wings has a thickening at one end.

3. The radiometric measuring device according to claim 1, wherein the holding region is designed to hold both a scintillator with a circular cross section and a scintillator with an angular, square, or rectangular cross section.

4. The radiometric measuring device according to claim 3, characterized in that as viewed in a plan view, the holding region has curved side walls, which lie on an imaginary circular line, and indentations between the curved side walls, which form the corners of an imaginary square.

5. The radiometric measuring device according to claim 4, wherein the resilient support elements extend from the indentations.

6. The radiometric measuring device according to claim 1, wherein the holding region includes an insertion chamfer on a side facing the scintillator.

7. The radiometric measuring device according to claim 6, further comprising a restoring element, wherein the scintillator is connected via the holding element to the restoring element, and wherein the scintillator is pressed by means of the restoring element in an axial direction.

8. The radiometric measuring device according to claim 7, wherein the restoring element is arranged in a captive manner on a side of the holding element, which faces away from the scintillator.

9. The radiometric measuring device according to claim 8, wherein the holding element further comprises a plurality of undercuts, behind which the restoring element engages.

10. The radiometric measuring device according to according to claim 9, wherein the holding element further includes a receptacle, and wherein the plurality of undercuts includes tabs protruding into the receptacle for the restoring element.

11. A scintillator holding element comprising:

a holding region for one end of a scintillator, wherein a holding element is formed in such a manner to center the scintillator in a transverse direction inside a housing, and resilient support elements arranged on an outside of the holding element, by means of which the holding element is supported on an internal wall of the housing, wherein the resilient support elements include wings, which extend over a part of a circumference of the holding element.

* * * * *